US005482007A

United States Patent [19]
Kumlin

[11] Patent Number: 5,482,007
[45] Date of Patent: Jan. 9, 1996

[54] DISPOSABLE PET TOILET ASSEMBLY

[76] Inventor: Robert R. Kumlin, 109 Wexford Dr., Cherry Hill, N.J. 08003

[21] Appl. No.: 220,829

[22] Filed: Mar. 31, 1994

[51] Int. Cl.$^6$ ................................................. A01K 29/00
[52] U.S. Cl. ................................................................ 119/169
[58] Field of Search ........................................ 119/172, 169, 119/171, 165, 706; 5/484, 487; 604/384

[56] References Cited

U.S. PATENT DOCUMENTS

| | | | |
|---|---|---|---|
| 2,505,176 | 4/1950 | Elder | 112/262 |
| 2,708,418 | 5/1955 | Sugarman et al. | 119/1 |
| 3,227,137 | 1/1966 | Campbell | 119/1 |
| 3,233,588 | 2/1966 | Thomas | 119/1 |
| 3,486,485 | 12/1969 | Kahanick | 119/706 |
| 3,684,155 | 8/1972 | Smith | 119/1 |
| 3,752,121 | 8/1973 | Brazzell | 119/1 |
| 3,809,013 | 5/1974 | Rigney et al. | 119/1 |
| 3,828,731 | 8/1974 | White | 119/172 |
| 3,990,396 | 11/1976 | Turk | 119/170 |
| 4,279,217 | 7/1981 | Behringer | 119/1 |
| 4,376,422 | 3/1983 | Whitehead et al. | 119/172 |
| 4,534,315 | 8/1985 | Sweeney | 119/165 |
| 4,541,359 | 9/1985 | Hickey et al. | 119/1 |
| 4,706,606 | 11/1987 | Coppola | 119/165 |
| 4,779,566 | 10/1988 | Morris | 119/165 |
| 4,800,077 | 1/1989 | Mack | 119/1 |
| 4,858,559 | 8/1989 | Allen | 119/165 |
| 4,869,204 | 9/1989 | Yananton | 119/165 |
| 4,934,316 | 6/1990 | Mack | 119/1 |
| 5,007,365 | 4/1991 | Paciullo | 119/170 |
| 5,100,600 | 3/1992 | Keller | 264/112 |

FOREIGN PATENT DOCUMENTS

2248785  6/1975  France ................................. 119/171

*Primary Examiner*—Thomas Price
*Attorney, Agent, or Firm*—Rothwell, Figg, Ernst & Kurz; Bart G. Newland

[57] ABSTRACT

A disposable pet toilet assembly comprising an absorbent material which is deployed in a plurality of strips which are attached together and caused to stand upright and arrayed to touch each other so as to develop friction and therefore provide a soft resilient grasslike texture attractive to animals. In its preferred embodiment, the strips are further attached to an absorbent base sheet and a liquid impervious membrane liner which prevents soiling and provides wrapping for the absorbent material for easy disposal. The assembly is designed to be used with a conventional kitty litter box or by itself as a portable and disposable toilet assembly for travelling with a pet.

22 Claims, 6 Drawing Sheets

DISPOSABLE PET TOILET ASSEMBLY

BACKGROUND - FIELD OF THE INVENTION

The present invention relates generally to pet toilet units, and more specifically to a completely disposable toilet unit, one aspect of which is that upon becoming sufficiently soiled by liquid and solid waste, the toilet unit can be easily discarded.

BACKGROUND - DESCRIPTION OF THE PRIOR ART

Many people, especially those in urban environments, must leave their pets indoors for periods of time and the animals are required to eliminate their waste within the enclosed, interior environment. Often this period of time lasts for many days, but most often the time is 10 to 12 hours each day which reflects the period required for full time employment and travel to and from the workplace. As more females enter the workplace, the traditional family structure with the woman functioning as a full time housekeeper and caregiver becomes the exceptional case. Therefore, the need for a better short term and convenient accommodation of animal waste products and their disposal for confined and unattended pets is required.

The well known solution to this problem has been the animal litter box. The basic device is a shallow open container most commonly containing an absorbent granular or pelletized material ("litter"), which material is disposed of periodically as it becomes soiled. Common litter materials include clay, diatomaceous earth and alfalfa; less common prior art includes peat, flyash, cedar chips, and various pelletized materials such as paper, sawdust and polyethylene foam. There are a number of problems associated with the basic device and its component parts, some of which have been addressed with limited success by various prior art refinements:

The utilization of absorbent clay, by far the most commonly used litter material, has a number of problems. It is heavy and inconvenient to use and, in addition to frequent spills, dust is discharged into the air when it is poured into and out of the litterbox. When the box is used, the animals natural instinct to bury the fecal matter and urine causes it to kick the litter out of the box, raise more airborne dust, and make a mess. Other less popular materials used for litter such as diatomaceous earth and fly ash have the same characteristics. In addition, all of these granular mineral products are unsanitary and are not recommended for use by veterinarians after animal surgery (especially the common claw removal for cats) as they are likely to cause infection. When a permanent litter box with a disposable plastic sheet liner is used (by far the most common assembly for domestic cats), a sufficient depth of granular material must be utilized to protect the liner from tearing due to the digging/burying instinct. This amount of material, in turn, requires the plastic liner to be sturdy enough to lift the material out of the box, making the liner more expensive.

Other pelletized or granular materials made of organically derived byproducts including pelletized paper, alfalfa, peat, sawdust, et. al., have been suggested to overcome the weight and dust problems of the granular minerals, but the light weight of these products exacerbates the problem of litter scattering and liner tearing, and many of them do not create a desirable texture for the animal to walk upon or utilize as a toilet.

An additional problem with all pelletized litters is the lack of portability. With the increase in mobility of the population, pets are often moved or taken on vacation requiring a portable animal toilet. Having to carry a bag of litter, liner, and litter box and having to set up and dispose of the assembly at a motel is often an exercise in creative logistics and always a serious inconvenience. Mack, U.S. Pat. No. 4,800,077, Jan. 31, 1989, proposes an animal waste collection pad with a frangible capsule which when broken will attract dogs: because of its flat sheet configuration and lack of attractive texture it is not likely to be either noticed or utilized by cats or other animals.

Providing a cover over the litter box has been proposed to eliminate the scattering problem of pelletized litter materials and contain odors, but these boxes are bulky in size and require constant cleaning. Covered boxes do not work well because animals resist going into a small enclosed space for elimination, preferring as open an outdoor space as possible for two reasons: it is the instinctual opposite of denning which prefers a closed space and animals will not soil a den; and, if the container has been previously used, there are always lingering odors which are also a deterrent. In addition, as the waste ages in the confined space, the odor concentration can get intense, and the, animal will be less likely to use the container.

Other prior art litter box solutions propose various assemblies of parts including, Sweeney, U.S. Pat. No. 4,534,315 (1985) which discloses an assembly wherein nonabsorbent granules are layered over an absorbent layer, and Yananton, U.S. Pat. No. 4,869,204 (1989) which discloses a three part assembly consisting of a screen to prevent tearing, an absorbent pad, and an impermeable plastic lining all of which is covered by a layer of granular litter. Brazzell, U.S. Pat. No. 3,752,121 is similar to Yananton except that an impermeable artificial grass is used as a protective layer above the absorbent pad. Other related patents include U.S. Pat. No. 3,233,588 which utilizes a screen above the litter to collect feces and U.S. Pat. No. 3,809,013 which incorporates granular litter and a stack of liners. While many additional patents could be cited regarding other variations of assemblies, none of these prior art solutions address the problems of either the portability or the scattering of pellitized litter and/or have not been commercially successful because they are too complex and costly, and require the maintenance and cleaning of the various component parts.

It is common knowledge and practice to use newspaper to house train dogs to eliminate in a chosen area and it is relatively well known that newspaper can be used in a litter box as a substitute for commercially available litter as an expediency. Indeed, the use of torn newspaper for litter is commonly recommended by veterinarians following surgery, so as to avoid the infections caused by granular mineral products entering the wounds. However, the use of newspaper for litter in sheet or torn form has some fundamental problems—In sheet form the litter is not appealing to animals (especially cats) because it surface texture is too smooth and it does not satisfy the digging/burying instinct. In addition, urine tends to stay on the surface as does fecal matter and both are likely to get tracked around the house. In addition, the waste products that are absorbed by the sheets stay wet and are not sufficiently aerated to dry out; the layers between the sheets become breeding grounds for odor causing bacteria and fungi. The sheets are not efficient absorbers of moisture because their exposed surface area is not great.

Tearing the newspaper into strips improves the performance of the newspaper as it increases the absorption area, creates pockets for aeration, and generates a more desirable texture for the animal. However, torn newspaper when laid in a litter box tends to get compressed, tangled, and matted together by the animal excrement: walking upon it gradually makes it lay flat and it quickly loses most of its desirable characteristics. In addition, when shredded paper is used, it precludes the utilization of a waterproof liner as the digging/burying will cause tears due to the lack of protection which is provided by paper sheets, a sufficient depth of granular material, or (less commonly) protective screens or layers suggested by some of the more complex prior art assemblies cited above.

Torn or shredded paper, particularly absorbent paper such as newsprint has been successfully used as a substitute for straw or shavings for large ruminants such as cattle. It is more absorbent than straw or shavings which contain high percentages of non-absorbent cellulose fibers. However, its use for smaller animals has not been as effective, as the "bedding" when cut into long strips tends to become entangled and matted with excrement. Whitehead et al., U.S. Pat. No. 4,376,422 (3/83), attempts to overcome this problem by cutting the paper into strips and varying the length of strips so that much of the material is in the form of diced paper 10 to 40 mm in width and up to 120 mm long. Although this invention claims to prevent tangling, it does not prevent the gradual compression and flattening of the material. Reducing the paper further to a particulate form creates particles which decompose on contact with urine into a pulp or mush which quickly loses its effectiveness. U.S. Pat. No. 5,001,600 attempts to obviate this problem by creating "tubular interlaced pellets" that have integral voids. Both the diced and pelletized paper would, of course, have the same scattering and textural problems mentioned previously if used in a typical open litter box.

It should be noted that the term "bedding" or "animal bedding" is similar in many respects to the term "litter" as they are both materials used to absorb animal waste. In common usage "bedding" is a material used in an animal confinement for both sleeping and absorbing waste products, "litter" is a single use material for waste only and the animal may be confined or not but does not sleep or live on it. For the purposes of the present invention, the words are considered interchangeable.

It is not new to take strips of material and attach them or weave them together to create a textured surface. Indeed, this is the configuration of cut pile carpet and fur-like fabrics. Additional, and perhaps more related applications, can be found including Elder, U.S. Pat. No. 2,505,176, Apr. 25, 1950 where an artificial grass mat as a grave decoration is proposed. Many other patents could be cited related to the creation of textured surfaces, but these are all decorative in nature and absorption is not the main objective.

The creation of loosely woven absorbent material is described in Charbonneau, French Patent No. 2 248 785, 1975 in which a loose mat of straw is woven with cellulose string to form a litter for ruminants and horses. This prior art, although tangentially applicable to the present invention, has only marginal utility as a pet toilet application. The problem with straw is that it is too messy a material to be utilized in a pet toilet and because of its high cellulose fiber content it is not sufficiently absorbent. If the methodology of construction were replicated utilizing a more suitable material such as shredded newspaper, there would be little improvement over the basic material as it would tend to lay flat and be subject to the matting and caking mentioned previously. Indeed, the only advantage of this prior art would be the elimination of loose fibers and the ability to gather and fabricate the strip material as a single and portable assembly.

It is common knowledge that a disposable liquid impermeable membrane or liner can be utilized to obviate the cleaning of the rigid permanent litter box container. When granular litter is employed, this plastic liner often doubles as a bag for disposal of the material. This liner can take the form of a simple sheet of plastic (the most common commercially available product) or in a variety of prior art forms including U.S. Pat. No. 5,007,375 (1991), wherein the liner is in the form of a plastic bag which slips over the entire box; Sweeny, U.S. Pat. No. 3,227,137 (1966), wherein the liner is elaborately folded, slips over the box edge and after use becomes a disposal bag; and U.S. Pat. No. 4,779,566 (1988) which is similar to Sweeny, but incorporates a retainer below the lip of the permanent box. There are many other variations, including: Goldman et al.; U.S. Pat. No. 3,227,137; Smith, U.S. Pat. No. 3,684,155; and Behringer, U.S. Pat. No. 4,279,217. All of these prior art solutions provide an easy disposal method, but all are related to the containment of pelletized or granular litter and require a sturdy plastic to support the weight when the material is disposed of.

SUMMARY OF THE INVENTION AND ITS OBJECTS AND ADVANTAGES

In contrast to the methods, materials and assemblies described above, the disposable pet toilet unit of the present invention provides for a simple, disposable assembly which eliminates the need for pellitized litter and its attendant problems, is attractive to animals, and obviates the cleaning required by more complex assemblies.

The disposable pet toilet of the present invention includes a pet toilet absorbent pad which is comprised of an absorbent fibrous., tufted, or shredded fabrication, which can be fabricated in a great variety of geometries to achieve the same effect, this effect being the creation of a resilient and uniform, soft textured grasslike surface, which gives the animal support while at the same time replicating the feel of soft grass or dirt. The effect is achieved by selective shredding of absorbent sheet materials such as paper and the arrangement of the resultant strips so that the natural longitudinal strength of the strips along with the friction developed along the cut edge is combined to generate the required characteristics. The absorbent pad can be used with or without an absorbent base sheet, which, in its preferred embodiment, is attached to a liquid impermeable membrane liner, which assembly in its preferred embodiment fits into a common permanent litter box and is held in place by restraining means to said litter box. Another preferred embodiment is the same assembly without the litter box which may be used primarily as a portable pet toilet while travelling with a pet. With either embodiment, after the litter is fouled, the entire assembly is wrapped within the liner and disposed of.

Accordingly, several objects and advantages of the present invention are:

(a) To provide a litter material and assembly which cannot be scattered by animals as a result of instinctive digging to bury waste matter.

(b) In it preferred embodiment, the utilization of recycled newspaper—To utilize recycled material to conserve forests and take advantage of its natural characteristics including high absorption and economy.

(c) To provide a litter material which is lighter in weight than conventional clay and mineral products and is easier to use.

(d) To provide a litter material which by its construction and geometry stands upright and therefore resists matting and entanglement and provides natural cavities for the containment, aeration and evaporative drying of urine and fecal matter.

(e) To provide a litter material which by geometry and arrangement utilizes the natural strength and frictional resistance of the cut edge of absorbent sheet material strips and, by the thus created arching effect, generates a soft and resilient texture similar to grass or dirt to encourage its use by animals, but cannot be scattered.

(f) To provide a more sanitary litter that will not cause infections in open wounds or surgical incisions.

(g) To provide a litter material which is highly absorbent by maximizing the exposed surface by slitting shredding, slicing, and/or geometric configuration and thereby enhancing the naturally absorbent qualities of a material.

(h) To provide a litter that will not generate dust or spills when it is put into the litter box or removed.

(i) To provide an animal litter which is portable, easy to set up, and easily disposed of while travelling with a pet.

(j) To provide a litter that is a one piece assembly which when combined with a plastic liner and inserted into a conventional litter box provides for convenience of use and disposal.

(k) To provide a litter that utilizes existing litter boxes and requires no special equipment to install, clean or utilize.

(l) To provide a litter geometry wherein the natural acts of walking upon and digging by the animal will improve the efficacy of the litter.

(m) To provide a litter assembly which when in combination with an impermeable liner, prevents it from tearing.

(n) To provide a litter which requires no cleaning.

In addition to the objects and advantages cited above, the present invention, in its preferred embodiment, utilizes recycled newspapers. Recycling of newspaper is mandatory in many communities and this practice is increasing. Such paper is usually bundled and commonly available as a cheap bulk commodity. Because of this increased recycling, the amount of waste paper is also increasing and there is an environmental need for reutilizing this material in lieu of other products. Newspapers are printed on highly absorbent paper and in addition, the principal ingredients in newspaper ink are carbon black or lampblack suspended in an oil vehicle: both carbonblack and lampblack are natural deodorants, effective in reducing the odors related to absorbed liquids. Therefore, although it is obvious that many absorbent natural materials and manufactured products could be utilized in the present invention, recycled newspaper is the presently preferred absorbent material: it has not been utilized extensively for animal litter heretofore, however, because of the other problems enumerated above.

Still further objects and advantages will become apparent from a consideration of the ensuing description and drawings.

DESCRIPTION OF THE DRAWINGS

In the drawings, closely related figures have the same number but different alphabetic suffixes.

LIST OF REFERENCE NUMERALS

19 Slits
21 absorbent paper sheet
22 Fold or fold line
23 Strips of absorbent paper
25 Absorbent base sheet
26 Pet toilet absorbent pad
27 Absorbent material attachment means
28 Pet toilet absorbent pad assembly
29 Liquid impermeable membrane liner
30 Elastic cord
31 Absorbent strands
32 Paper tabs
33 Tufts
37 Attachment means—absorbent material to impermeable sheet
39 Attachment means—impermeable sheet to itself for disposal or to permanent litter box or supporting surface
41 Conventional litter box
43 Supporting surface

DETAILED DESCRIPTION WITH REFERENCES TO THE DRAWINGS

Figures 1A, 1B:
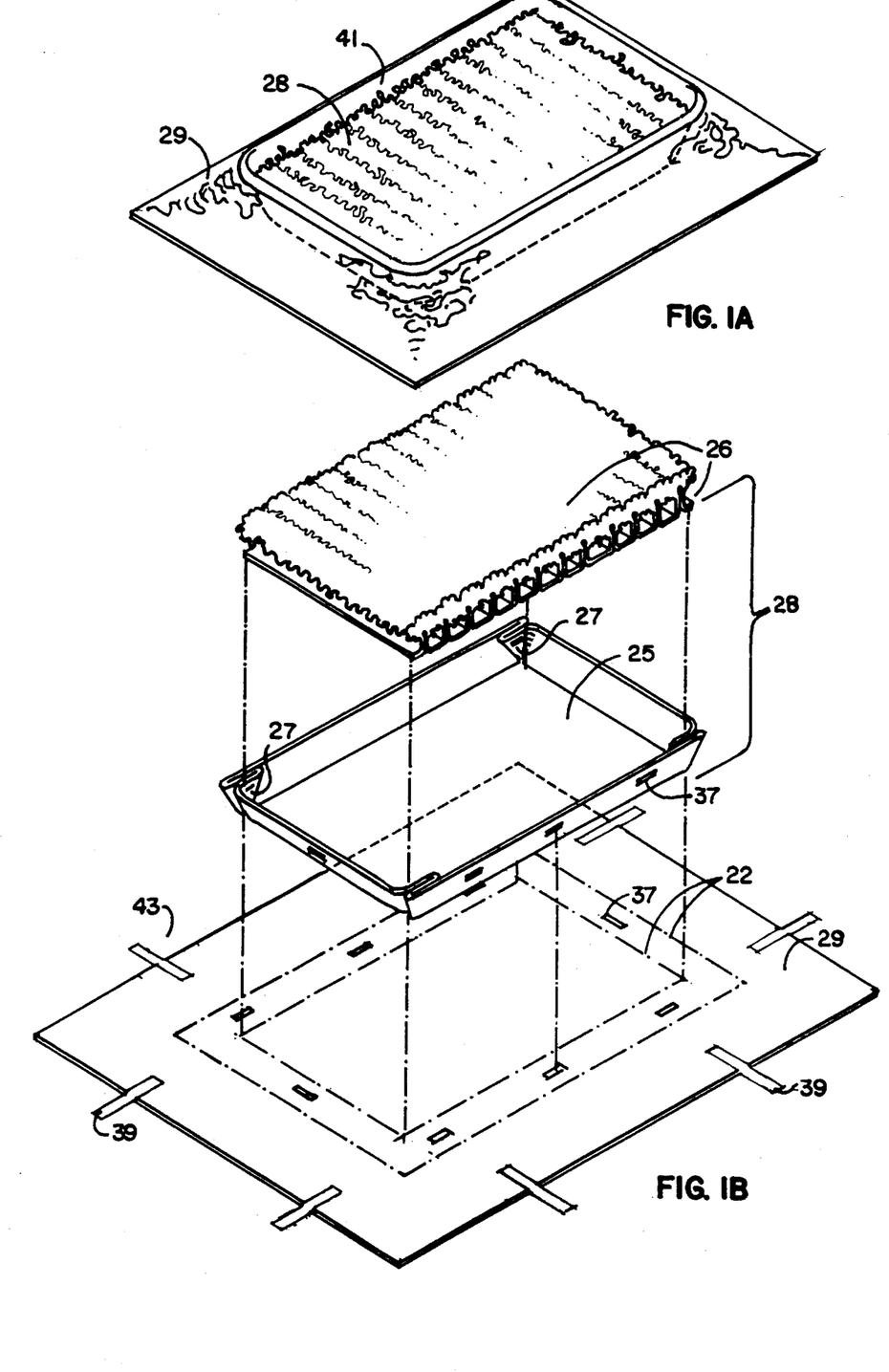
FIG. 1A shows the deployment of fire preferred embodiment of the pet toilet in a litterbox.
FIG. 1B shows an exploded view of the preferred embodiment arrangement of parts.

FIG. 1A shows an overall view of the preferred embodiment in which a pet toilet absorbent pad assembly 28 and a liquid impermeable membrane liner 29 would then be inserted in and attached to a conventional litter box 41 by an attachment means 30. In the preferred embodiment which is illustrated, the attachment means is an elastic cord 30 which fits under the lip of the litter box and is shown in FIG. 2D, which figure describes in more detail some of the components utilized when the present invention is used with litter box 41.

FIG. 1B shows an exploded view of some of the components of the present invention. A pet toilet absorbent pad 26 is shown in the preferred embodiment shown in FIG. 2D. An absorbent base sheet 25 is shown with the edges turned up and the corners folded and secured by absorbent material attachment means 27, which in the preferred embodiment would be staples or paper tabs. A thus created pet toilet absorbent pad assembly 28 is then attached to a liquid impermeable membrane liner 29 by attachment means 37 at predetermined intervals. In the preferred embodiment, the attachment means would be either an adhesive, two sided adhesive tape, or a mechanical fastener such as a stapel. When the alternate embodiment of the present invention is to be utilized for travel without a litter box, the liquid impermeable membrane liner 29 is simply secured to the floor or supporting surface 43 by attachment means 39 at predetermined intervals. FIG. 2E shows another application of use without a litter box; in this application, the edge of absorbent base sheet 25 is not turned up.

Figure 2A:
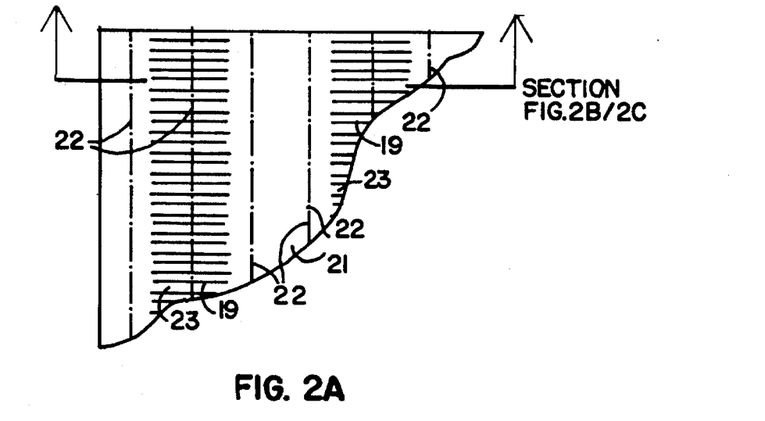
FIG. 2A shows a plan of a portion of the partially slit absorbent sheet material used to fabricate the preferred embodiment illustrated in detail in FIGS. 2B, 2C, and 2D.
Figure 2B:
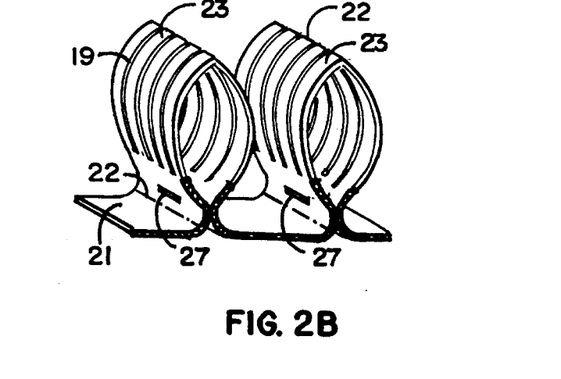
FIG. 2B shows a sectional detail of the slit absorbent sheet material after folding and attaching but prior to cutting to free the ends of the paper strips.
Figure 2C:
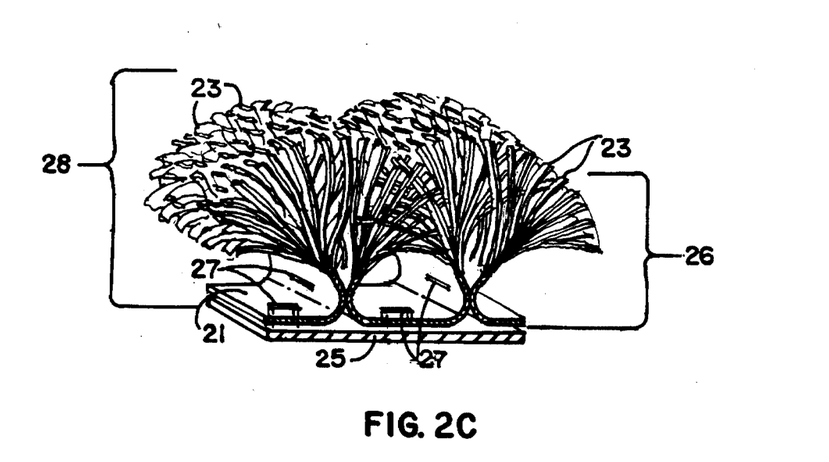
FIG. 2C shows a detail of the final geometry after the absorbent strips are cut.
Figure 2D:
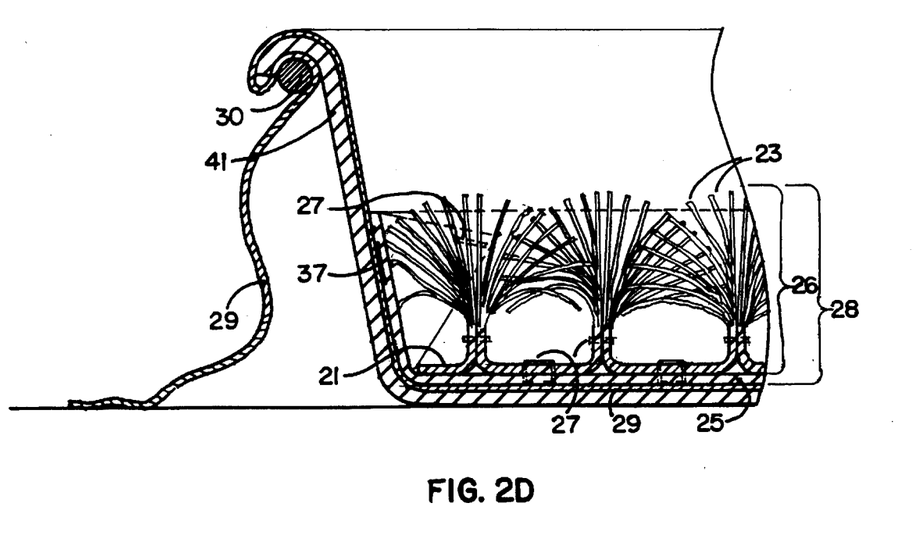
FIG. 2D shows a partial sectional detail of a complete assembly of the preferred embodiment.
Figure 2E:
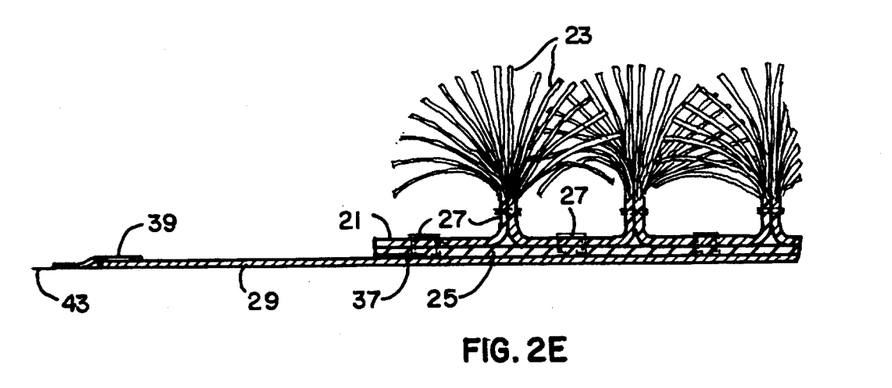
FIG. 2E shows a detail of a complete assembly of the preferred embodiment used with an absorbent base sheet which is not turned up to create a pan and without a litter box.

FIGS. 2A, 2B, 2C, 2D, and 2E, illustrate the preferred embodiment of the present invention. So that it be made clear by the process of fabrication how the final geometry is achieved, FIG. 2A shows a plan view of an absorbent paper sheet 21 that has parallel slits of a predetermined width 19 cut through it, forming strips of paper 23. Sheet 21 is then creased along the fold lines 22. In the preferred embodiment, sheet 21 is a plurality of thicknesses of newspaper sheets.

In FIG. 2B, an isometric projected section of a small portion of an absorbent paper sheet 21 illustrating two paper loops. Sheet 21 is shown folded and secured by an absorbent material attachment means 27 to form upright closed loops of strips of absorbent paper 23. Preferred attachment means 27 are metal staples, although stitching with a thin line of twisted fiber, either in spots or continuously, will work equally well as will the use of punching and the utilization of paper tabs or other fasteners.

In FIG. 2C, upright loops of a paper sheet are cut at the apex of the loops to free the ends of paper strips 23, which are then agitated to form the final geometry. Although a pet toilet absorbent pad 26 thus formed is self supporting and may be utilized alone, in the preferred embodiment the pad is attached to an absorbent base sheet 25 with an absorbent material attachment means 27 to give it more rigidity. In its preferred embodiment, absorbent base sheet 25 is a plurality of sheets of newspaper. Together, absorbent pad 26 and base sheet 25 comprise a pet toilet absorbent pad assembly 28. The final geometry of the interlaced paper strips 23 create many intersections and the resulting arching caused by edge friction at these intersections and their substantially upright orientation causes the overall surface to have support for the animal and resilient memory. This feature is common to both the preferred embodiment and two alternate embodiments shown in Figures Series 3 and 4. It is obvious that many additional alternate geometries and fabrication methods are possible.

FIG. 2D shows a sectional detail of the preferred embodiment of a pet toilet absorbent pad 26 combined with an absorbent base sheet 25 which is turned up at the edges and secured at the corners by an attachment means 27 (see FIG. 1B for overall view), thus forming a pet toilet absorbent pad assembly 28. When absorbent sheet 25 is turned up at the corners, the angle and curvature can be adjusted by the placement of attachment means 27 so that a reasonably tight fit can be achieved. Assembly 28 is then secured to a liquid impermeable membrane liner 29 by an attachment means 37, which in the illustrated preferred embodiment is an adhesive which is spot applied at predetermined intervals. Alternate means of attachment 37 include mechanical fasteners such as staples or rivets, or attachment can be accomplished by stitching with a thin line of twisted fiber. The impermeable liner 29, in its preferred embodiment, is a sheet of biodegradable plastic of a predetermined thickness and strength which is fabricated larger than a conventional litter box 41 and is restrained from moving by an elastic cord 30 which is wrapped under the lip of litter box 41. Alternate means of attachment could include using a drawstring or elastic shrinkage such as suggested in U.S. Pat. No. 4,869,204 Yananton, September 1989, or simply tucking the excess liner 29 under the litter box, and allowing the tight fit of turned up absorbent sheet 25 to hold it in place.

FIG. 2E shows a section of the preferred embodiment similar to 2D, but the toilet is used without a litter box as a portable unit for travelling and a liquid impermeable liner 29 is attached to a supporting surface 43 by an attachment means 39 which, in the preferred embodiment, would be a pressure sensitive tape with peel off face located at predetermined intervals. In the illustration, an absorbent base sheet 25 is shown without having the edge turned up. Alternatively, the absorbent base sheet 25 could be turned up without the utilization of a litter box 41 shown in FIG. 1D.

Figure 3A:
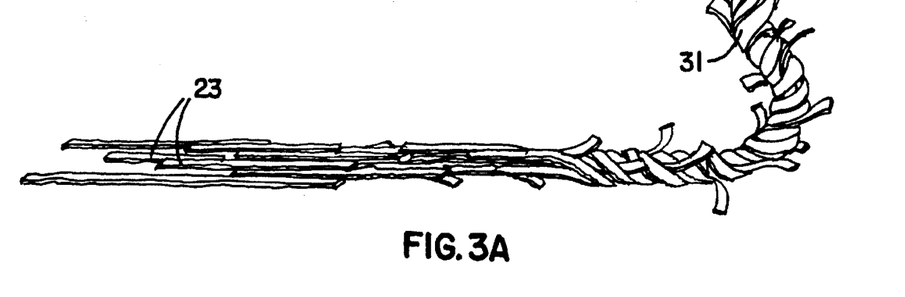
FIG. 3A shows an alternate embodiment in which strips of an absorbent material are first woven into a continuous strand.
Figure 3B:
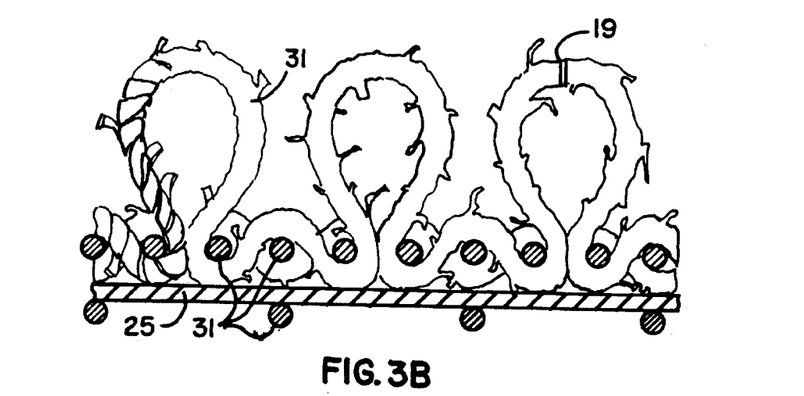
FIG. 3B shows a detail of the final assembly of the alternate embodiment in which the strands are woven to a substrate but prior to cutting.
Figure 3C:
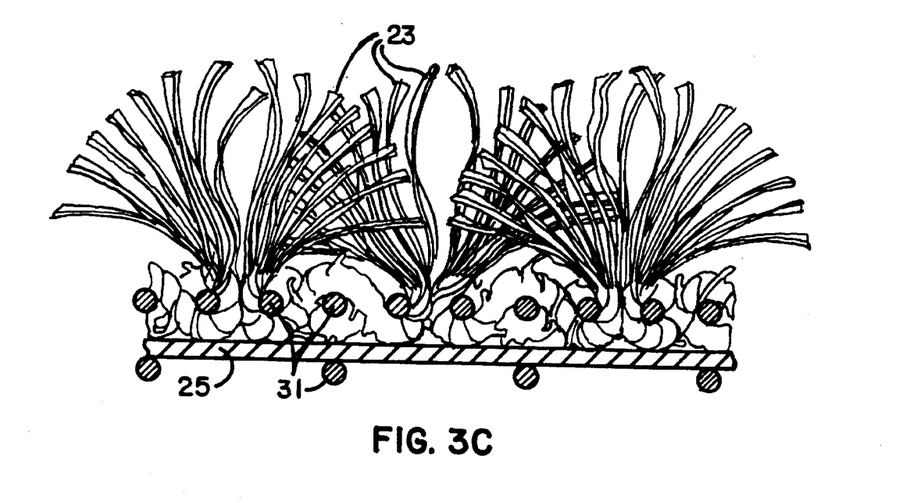
FIG. 3C shows a detail of the final assembly of the alternate embodiment shown in FIG. 3B after the strands are cut and final geometry achieved.

FIGS. 3A, 3B, and 3C illustrate an alternate embodiment of the pet toilet absorbent pad of the present invention which fabricates paper strips into paper strands or ropes which are then secured together to create the pet toilet absorbent pad. FIG. 3A shows a plurality of strips of paper of a predetermined length and width 23 which are oriented in a parallel direction and then twisted into a continuous rope or strand 211. The method of fabrication for doing this are those of carding, spinning and other processes commonly used to weave twisted fibre strands of natural materials such as cotton or wool except that strips 23 and strands 31 are much larger in size. The friction developed along the cut edges of the strips is similar to that developed with natural fibers utilized for making cloth and holds them in place without adhesive. In the preferred embodiment, strips 23 are strips of shredded newspaper.

FIG. 3B shows a detailed cross section of the alternate embodiment of the pet toilet absorbent pad of the present invention in which the absorbent strand 31 illustrated in FIG. 2A is woven into large loops which are threaded through a woven base sheet comprised, in the preferred embodiment, of other absorbent strands 31 of a similar or smaller diameter woven in both directions.

FIG. 3C shows the final geometry of the structure after the loops are cut and the strips of paper 23 are agitated to achieve a grasslike texture. Alternate methods of attachment of the strands 31 to an absorbent base sheet 25 could include weaving or tying with a thin line of twisted fiber or utilizing adhesive. These fabrication methods are commonly used to manufacture cut pile carpets, and suede or fur like fabrics, except that the size of the components in the present invention are larger in scale.

Figure 4A:
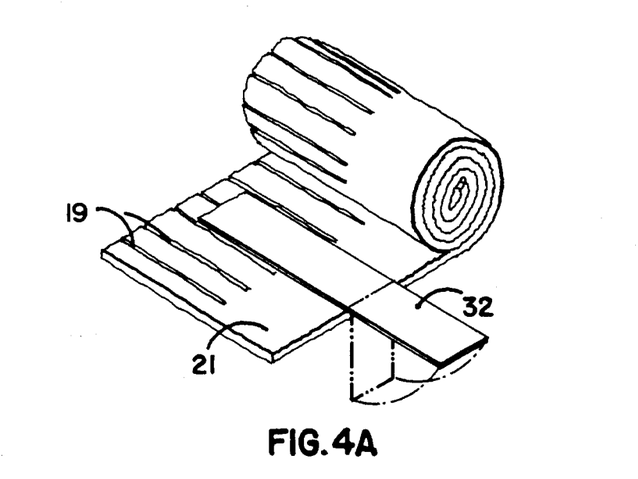
FIG. 4A shows a detail of a portion of the partially slit absorbent sheet material used to fabricate a tufts of an alternate embodiment further illustrated in detail in FIGS. 4B and 4C.
Figure 4B:
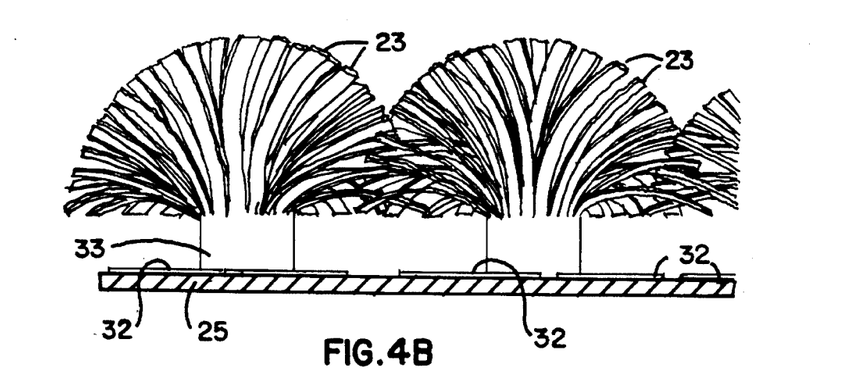
FIG. 4B shows a sectional detail of the tuft and a means of assembly to an absorbent base sheet.
Figure 4C:
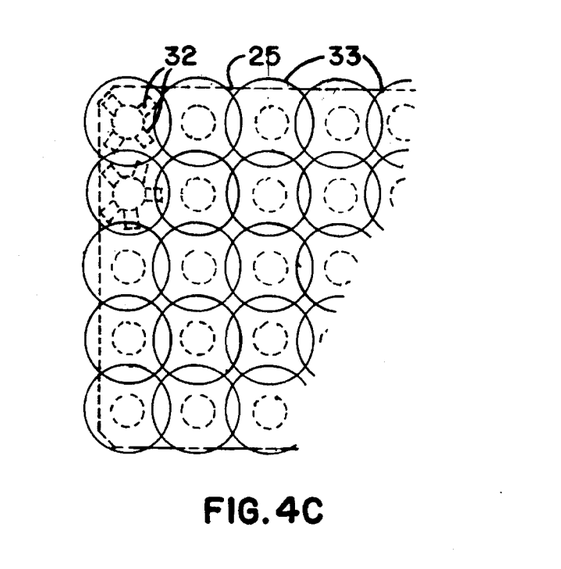
FIG. 4C shows a plan of the tufts arranged to create an absorbent pad.

FIG. 4A, 4B, and 4C, show yet another alternate embodiment of the pet toilet absorbent pad of the present invention which fabricates partially slit paper into tufts 33 which are then secured to an absorbent base sheet 25. FIG. 4A shows a sheet of paper 21 which has slits 19 at the top margin. The paper 21 is then rolled in a cylindrical shape to form a tuft 33 which is shown in FIG. 4B. A plurality of paper tabs 32 are rolled into the cylinder to form an attachment to the absorbent base sheet 25 which is shown in FIG. 4B.

FIG. 4B shows a detailed elevation of a tuft 33 which, by crushing down and agitating, spreads the free ends of the strips of paper into a soft grasslike texture and creates the arching effect required for support and resiliency. In the illustrated preferred embodiment, the tuft 33 is attached to an absorbent base sheet 25 by paper tabs 32 which are secured by adhesive. Alternative means of attaching tabs 32 could include mechanical devices such as staples or rivets or the utilization of a thin line of twisted fiber to stitch tab 32 onto the backing. Alternatively tuft 33 could be attached directly to absorbent base sheet 25 by punching holes in base sheet 25 of similar diameter as tufts 33 and inserting and securing tufts 33 with adhesive to the absorbent base sheet 25, thus obviating the need for paper tabs 32.

FIG. 4C shows a partial plan view of a pet toilet absorbent pad assembly 26 (see FIG. 4B) comprised of an orthogonal array of tufts 33 attached to an absorbent base sheet 25 by paper tabs 32. Alternative geometric arrays and numbers of tufts to achieve the required effect and overlap are many and the plan shows only one of these possible arrangements.

Figure 5A:
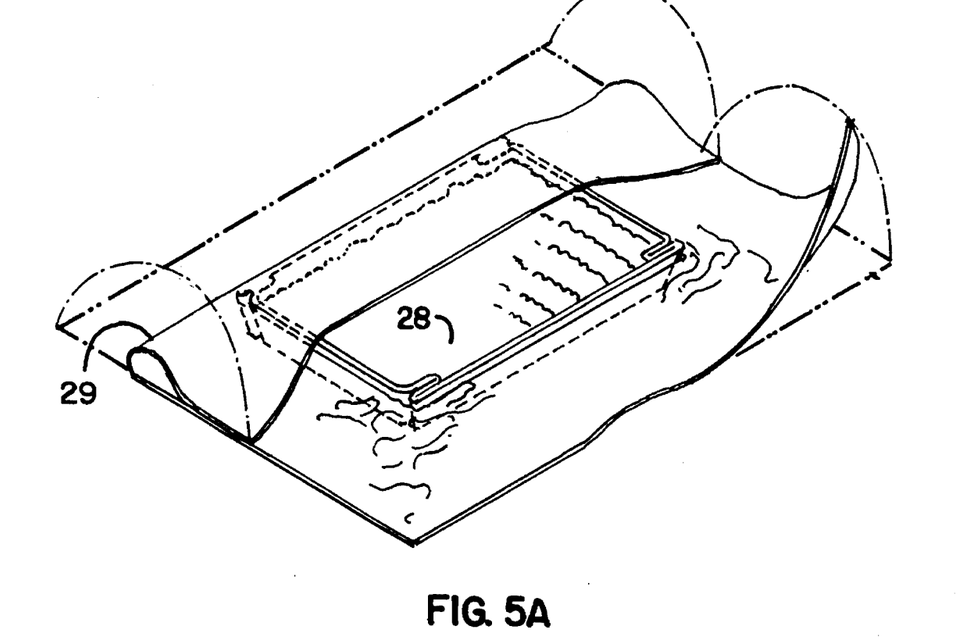
FIG. 5A shows the folding of a liquid impermeable membrane over a pet toilet absorbent pad or absorbent pad assembly for disposal.
Figure 5B:
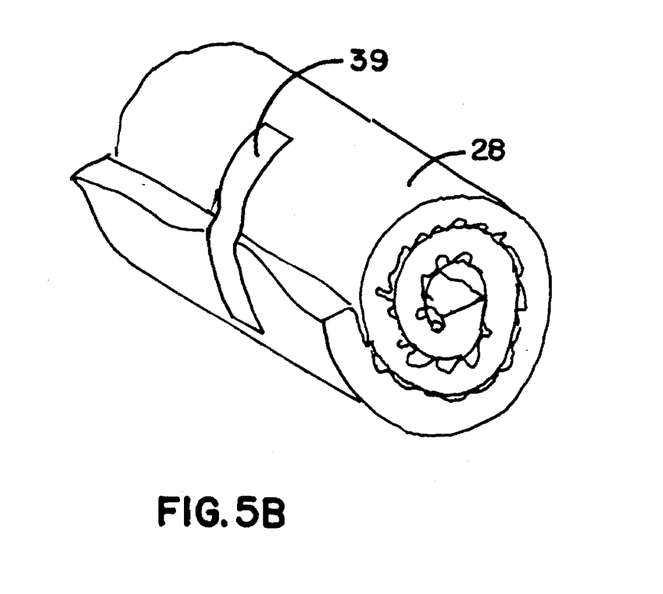
FIG. 5B shows a pet toilet absorbent pad or absorbent pad assembly rolled up inside a liquid impermeable membrane for disposal.

FIG. 5A shows a liquid impermeable membrane 29 partially folded over a pet toilet absorbent pad assembly 28 for disposal. After the sides are folded over, the ends would then be folded or vice versa. FIG. 5B shows the folded package rolled up in the folded liquid impermeable membrane liner and secured with an attachment means 39 into an easily disposable compact package. In the preferred embodiment the attachment means 39 would be a single or predetermined number of strips of pressure sensitive adhesive tape with a peel off facing.

OPERATION—FIGS. 1A, 1B, 2D, 2E, 5A, and 5B

In the preferred embodiment where the a pet toilet absorbent pad assembly 28 is used in conjunction with a conventional litter box 41, the pet toilet complete with a liquid impermeable membrane liner 29 is simply inserted into litter box 41, with liquid impermeable membrane liner 29 hanging over all four edges (FIG. 1A). An elastic cord 30 is then stretched over the rim of the litter box 41 to secure the pet toilet (FIG. 2D). In an alternate embodiment, in which the pet toilet is utilized without litter box 41 (FIG. 1B and 2E), liquid impermeable membrane liner 29 is simply stretched out and taped to a supporting surface 43 by an attachment means 39 which, in the preferred embodiment, would be pressure sensitive adhesive tape with a peel off surface. The latter configuration catches any feces that may be kicked out of the pet toilet and prevents the soiling of the surrounding floor or supporting surface. After the pet toilet is soiled, liquid impermeable membrane liner 29 is folded over (FIG. 5A) and then rolled up and secured (FIG. 5B) for disposal.

SUMMARY, RAMIFICATIONS, AND SCOPE

From the description above, a number of advantages of my pet toilet become evident:

(a) By attaching the paper strips upright and agitating them an arched fabrication is created which utilizes the compression resistance along the longitudinal axis of a paper strip in combination with the friction developed along the sheared paper edge to create a soft and resilient grass like texture which is attractive to animals as it satisfies the burying instinct with just enough firmness to be easy to walk on. The burying/digging actions of the animal actually agitates the paper strips and makes them fluffier and more attractive.

(b) By attaching the paper strips upright, the paper strips that are soaked with urine dry rapidly because of the constant aeration around each fiber. This rapid drying, combined with the natural deodorizers of carbon black in the preferred embodiment of recycled newspapers tends to dissipate odor rapidly.

(c) By attaching the paper strips upright in folds or tufts, voids to trap the heavier and drier solids are created beneath them while the wetter semi-solid feces are trapped between the strips and, thus suspended,dry rapidly.

(d) By attaching the paper strips-upright in folds or tufts, they are resistant to the tangling, matting, caking and compression of litter made of randomly laid absorbent strips or natural materials as they are used and walked upon by animals.

(e) By attachment of the paper strips into a one piece portable toilet, an assembly is created which cannot be scattered by an animal, is light in weight, easy to carry and deploy, and easy to dispose of.

(f) By cutting naturally absorbent paper into strips, the absorbency and exposed surface for wetting and drying are maximized and the required amount of absorbent material can be minimized creating a lightweight and economical product.

(g) By combining an absorbent pad with a liquid impermeable membrane liner, an assembly is created that eliminates all cleaning related to the pet toilet. Whether used in conjunction with a conventional litter box or by itself, the pet toilet is simply disposed of as a small quantity of trash after it is used by the animal.

(h) By the elimination of pellitized litter the problem of dust creation, animal scattering, lack of portability, infections, and the requirement of a heavy liquid impermeable liner are all simultaneously eliminated.

Although the description above contains many specifities, and the present invention is shown in a number of embodiments, these should not be construed as limiting the scope of the invention but merely providing illustrations of some of the presently preferred embodiments of this invention. For example, the paper strips could be attached at the middle with both ends free, or arrayed in various folds and configurations to achieve the same result, the paper strips could be shorter and cut finer to become almost a fur-like texture etc.

Thus the scope of the invention should be determined by the appended claims and their legal equivalents, rather than by the examples given.

Having thus described my invention, I claim:

1. A pet toilet absorbent pad comprising a plurality of flexible and resilient strips of absorbent material adhered to a base sheet, said strips being secured to said base sheet so that a portion of the strips stand substantially freely upright, said strips being spaced apart so as to touch and develop frictional support for one another along discontinuous portions of adjacent strips.

2. A pet toilet absorbent pad according to claim 1, wherein said absorbent material is paper.

3. A pet toilet absorbent pad according to claim 1, wherein said absorbent material is newsprint.

4. A pet toilet absorbent pad according to claim 1, wherein each of said strips are comprised of a plurality of strands of absorbent material.

5. A pet toilet absorbent pad according to claim 2, wherein each of said strips are comprised of a plurality of strands of paper.

6. A pet toilet absorbent pad according to claim 1, wherein said base sheet is comprised of an absorbent material.

7. A pet toilet absorbent pad according to claim 1, further comprising a liquid impermeable membrane disposed on a lower surface of said base sheet.

8. A pet toilet absorbent pad assembly according to claim 7, wherein said absorbent pad has a predetermined length and width and said liquid impermeable membrane has a length and width that are greater than the length and width of the absorbent pad.

9. A pet toilet absorbent pad comprising a plurality of spaced apart, substantially upright-standing, flexible and resilient tufts attached to a base sheet, each of the tufts comprising a plurality of strips of absorbent material each of said strips comprising a free first end, each of said strips further comprising a second end attached at a base portion of said tuft, said tufts disposed in proximity to one another so as to cause strips of one tuft to discontinuously touch and develop frictional support with strips of an adjacent tuft.

10. A pet toilet absorbent pad according to claim 9, wherein said absorbent material is paper.

11. A pet toilet absorbent pad according to claim 9, wherein said absorbent material is newsprint.

12. A pet toilet absorbent pad according to claim 9, wherein each of said strips are comprised of a plurality of strands of absorbent material.

13. A pet toilet absorbent pad according to claim 10, wherein each of said strips are comprised of a plurality of strands of absorbent material.

14. A pet toilet absorbent pad according to claim 9, further comprising a bottom surface comprised of an absorbent base sheet attached to a base portion of said tufts.

15. A pet toilet absorbent pad according to claim 14, wherein edge portions of said absorbent pad are folded upon themselves and secured at a multiplicity of corners thus formed so as to stand substantially upright, thereby forming a pan.

16. A pet toilet absorbent pad according to claim 9, further comprising a liquid impermeable membrane disposed upon a lower surface of said pad.

17. A pet toilet absorbent pad according to claim 14, further comprising a liquid impermeable membrane disposed upon a lower surface of said absorbent base sheet.

18. A pet toilet absorbent pad assembly according to claim 16, wherein said absorbent pad has a predetermined length and width and said liquid impermeable membrane has a length and width that are greater than the length and width of the absorbent pad.

19. A pet toilet absorbent pad assembly according to claim 17, wherein said absorbent pad has a predetermined length and width and said liquid impermeable membrane has a length and width that are greater than the length and width of the absorbent pad.

20. A pet toilet absorbent pad assembly according to claim 19, wherein said liquid impermeable membrane further comprises attachment means, disposed at an edge portion of the membrane, for securing the membrane around the absorbent pad after soiling by a pet.

21. A pet toilet absorbent pad according to claim 9, wherein said base sliest is comprised of an absorbent material.

22. A pet toilet absorbent pad according to claim 21, wherein said absorbent material is paper.

* * * * *